(12) United States Patent
Lenger

(10) Patent No.: US 8,438,399 B2
(45) Date of Patent: May 7, 2013

(54) STORAGE METHOD FOR A GAMING MACHINE

(75) Inventor: Drazen Lenger, Rushcutters Bay (AU)

(73) Assignee: Aristocrat Technologies Australia Pty, Ltd (AU)

( * ) Notice: Subject to any disclaimer, the term of this patent is extended or adjusted under 35 U.S.C. 154(b) by 1113 days.

(21) Appl. No.: 12/057,567

(22) Filed: Mar. 28, 2008

(65) Prior Publication Data

US 2008/0244160 A1 Oct. 2, 2008

(30) Foreign Application Priority Data

Mar. 29, 2007 (AU) ................................ 2007901687

(51) Int. Cl.
*G06F 11/00* (2006.01)

(52) U.S. Cl.
USPC .............. 713/187; 726/22; 726/26; 713/179; 713/189

(58) Field of Classification Search ......................... None
See application file for complete search history.

(56) References Cited

U.S. PATENT DOCUMENTS

| | | | | |
|---|---|---|---|---|
| 6,902,481 B2 * | 6/2005 | Breckner et al. | ................. | 463/30 |
| 7,802,087 B2 * | 9/2010 | Gatto et al. | ................... | 713/100 |
| 2003/0195033 A1 * | 10/2003 | Gazdic et al. | ................... | 463/20 |
| 2006/0035713 A1 * | 2/2006 | Cockerille et al. | ............... | 463/42 |
| 2006/0100010 A1 * | 5/2006 | Gatto et al. | ...................... | 463/29 |
| 2007/0032288 A1 | 2/2007 | Nelson et al. | | |
| 2007/0288662 A1 * | 12/2007 | Chen | ............................ | 709/247 |
| 2008/0182667 A1 * | 7/2008 | Davis et al. | ..................... | 463/43 |

FOREIGN PATENT DOCUMENTS

| | | |
|---|---|---|
| EP | 1679634 | 12/2006 |
| WO | 0199067 | 12/2001 |
| WO | 2006091252 | 8/2006 |

OTHER PUBLICATIONS

Jul. 16, 2009—Examiner's First Report on Patent Application No. 2008200752 by Aristocrat Technologies Australia Pty Limited.
Feb. 22, 2010—Examiner's Report No. 2 on Patent Application No. 2008200752 by Aristocrat Technologies Australia Pty Limited.
Apr. 27, 2011—Examiner's First Report on Patent Application No. 2010238556 by Aristocrat Technologies Australia Pty Limited.

* cited by examiner

*Primary Examiner* — Shewaye Gelagay
(74) *Attorney, Agent, or Firm* — McAndrews, Held & Malloy, Ltd.

(57) ABSTRACT

In a first aspect the invention provides a storage method for a gaming machine, including allocating program code to one of at least two program categories including a first category of program code that is expected to be modified more frequently than a second category of program code and storing program code from the first and second categories in logically separate storage areas.

8 Claims, 3 Drawing Sheets

STORAGE METHOD FOR A GAMING MACHINE

RELATED APPLICATIONS

This application claims priority to Australian Provisional Patent Application No. 2007901687, filed Mar. 29. 2007, entitled "A Storage Method for a Gaming Machine." The foregoing application is herein incorporated by reference in its entirety

BACKGROUND OF THE INVENTION

The present invention generally relates to a storage method for a gaming machine, a gaming machine, and a gaming system.

Gaming machines must meet high standards of security in order to obtain regulatory approval. This presents challenges in an environment where aspects of the gaming machine may be modified dynamically. Embodiments of the present invention address some of those challenges.

SUMMARY OF THE INVENTION

In a first aspect the invention provides a storage method for a gaming machine, comprising:
  allocating program code to one of at least two program categories including a first category of program code that is expected to be modified more frequently than a second category of program code; and
  storing program code from the first and second categories in logically separate storage areas.

In an embodiment, the method comprises authenticating any program code that modifies a storage area prior to executing the program code.

In an embodiment, the program code that modifies a storage area is authenticated by authenticating the storage area.

Thus, in this embodiment, only a storage area that is modified needs to be authenticated prior to execution and the gaming machine can continue to trust program code from the other storage area or areas.

In an embodiment, each logically separate storage area is also authenticated at least each time the gaming machine is booted.

In an embodiment, the program code is stored as packages and the method comprises authenticating a package that modifies the storage area.

In an embodiment each package is also authenticated at least each time the gaming machine is booted.

Depending on the embodiment a modification may comprise an addition of program code to the storage area, replacement of program code to the storage area, or an update to program code to the storage area.

In a embodiment, the first category of program code is game code.

In a embodiment, there are three categories of program code stored in logically separate storage areas to one another, game code, core code and system code.

In an embodiment, there are three logically separate storage areas. In an embodiment, the logically separate storage areas are on the same storage medium.

In some embodiments, one or more categories of program code may be stored in a plurality of logically separate storage areas separate to the storage areas of other categories.

The storage medium may be compact flash, a hard drive or other data storage medium.

In a second aspect the invention provides an electronic gaming machine, comprising:
  one or more storage mediums arranged into at least two logically separate storage areas, including a first storage area and a second storage area, the first area being allocated to a first category of program code that is expected to be modified more frequently than a second category of program code stored in the second storage area; and
  a data modification controller arranged to process modifying program code in order to control the storage area that is modified based on the category to which the program code belongs.

In an embodiment, the electronic gaming machine comprises an authenticator arranged to authenticate program code in response to modification of a storage area, the authentication being performed prior to executing the modified program.

In an embodiment, the gaming machine is adapted to receive modifying program code from one or more content servers.

Depending on the embodiment, the modifying program code may add to existing program code, replace existing program code and/or update existing program code.

In a third aspect the invention provides a gaming system, comprising:
  a gaming machine comprising
  one or more storage mediums arranged into at least two logically separate storage areas, including a first storage area and a second storage area, the first area being allocated to a first category of program code that is expected to be modified more frequently than a second category of program code stored in the second storage area; and
  a data modification controller arranged to process modifying program code in order to control the storage area that is modified based on the category to which the program code belongs; and
  at least one content server in data communication with the gaming server and adapted to provide modifying program code to the gaming machine.

Depending on the embodiment, the modifying program code may add to existing program code, replace existing program code and/or update existing program code.

Depending on the embodiment the modifying program code may be pulled from the content server or pushed to the gaming machine or a combination of push and pull depending on, for example, a characteristic of the program code. For example, gaming code may be pulled whereas system code may be pushed.

BRIEF DESCRIPTION OF SEVERAL VIEWS OF THE DRAWINGS

Certain exemplary embodiments of the invention will now be described in relation to the following drawings in which.

DETAILED DESCRIPTION OF THE INVENTION

Figure 1:
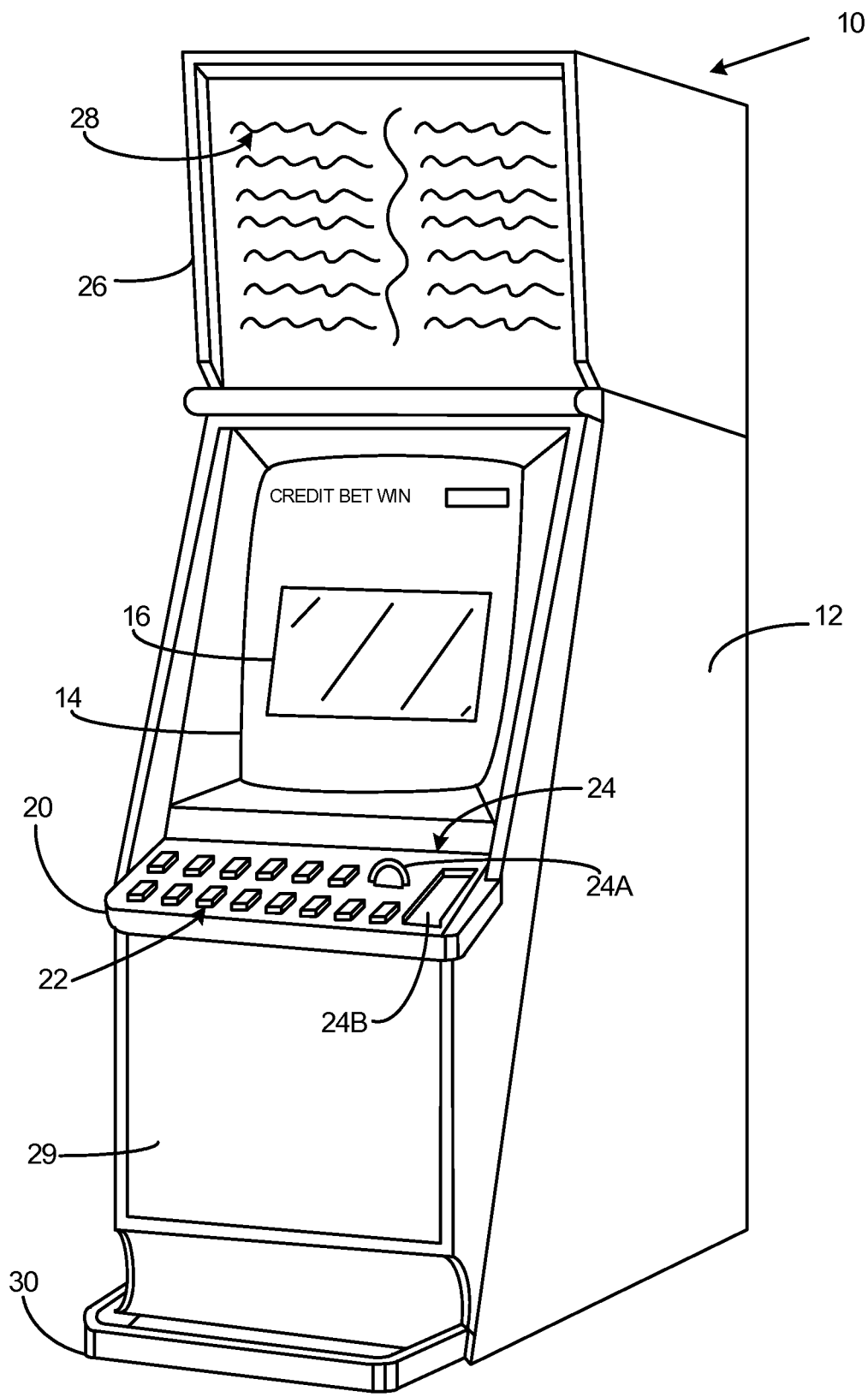
FIG. 1 is a perspective view of a gaming machine.

Referring to the drawings, there is shown a gaming system incorporating an electronic gaming machine arranged to implement a storage method in which program code is categorized and program code of different categories is stored in logically separate storage areas ("partitions").

A gaming machine 10 is illustrated in FIG. 1. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 2:
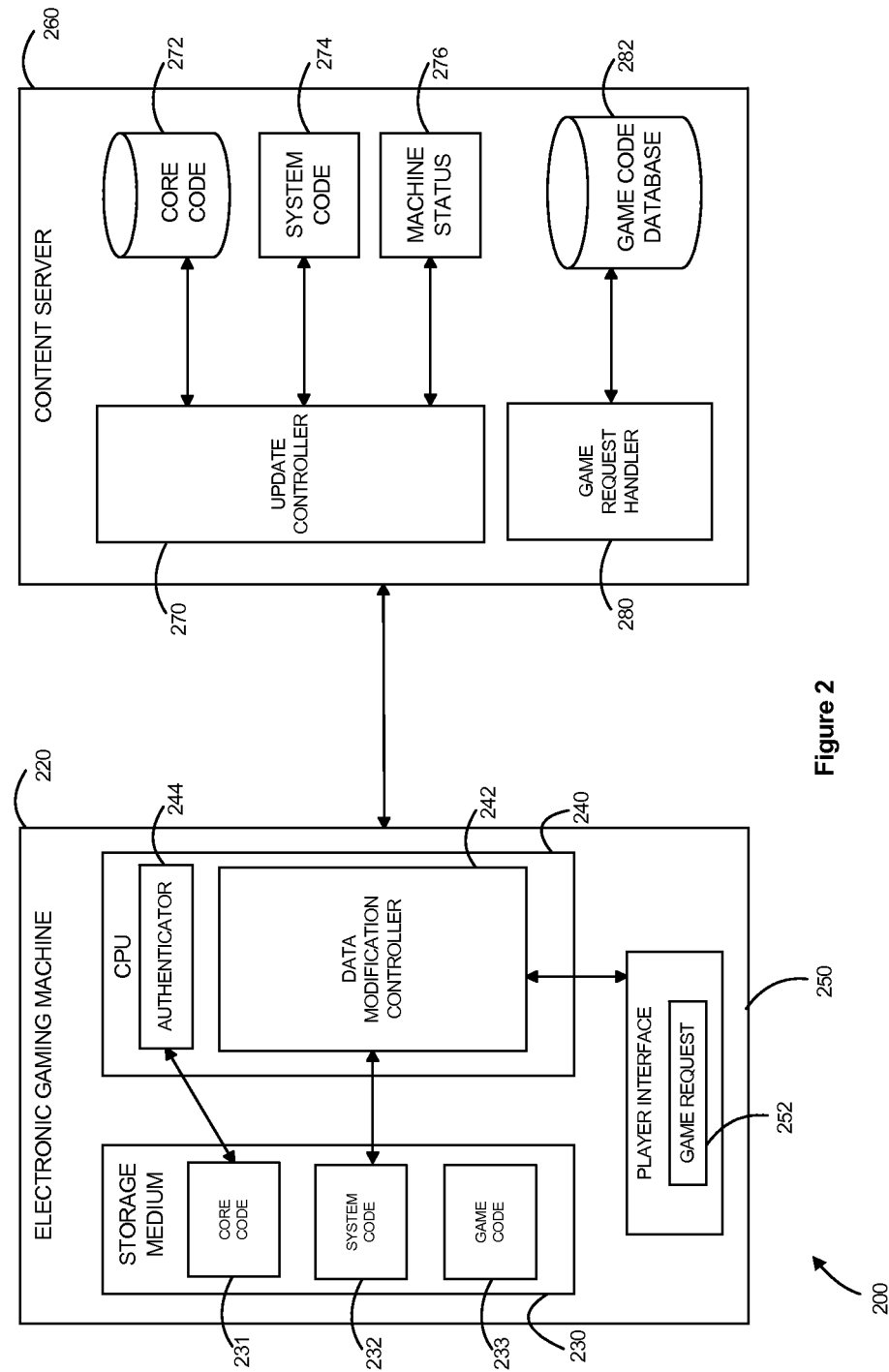
FIG. 2 is a schematic diagram of the main components of the gaming machine that relate to implementation of the security method.

As illustrated in FIG. 2, a gaming system 200 has a electronic gaming machine 220 having a central processing unit (CPU) 240 and a content server 260. FIG. 2 illustrates the embodiment in respect of an example of a single electronic gaming machine and a single content server. A person skilled in the art will appreciate that in practice that there will be a plurality of electronic gaming machines each in data communication with a content server and that there may be a number of different configurations of the content server. For example, there may be a plurality of content servers providing the same content or there may be a content servers dedicated to specific content. For example, FIG. 2 shows the content server having two separate functions of an update controller 270 and a game request handler 280 which could be handled by separate content servers.

Referring to FIG. 2, the electronic gaming machine 220 has a storage medium 230 and stores code in three separate partitions 231, 232, 233. In the embodiment the code is divided into three categories, core code stored in a core code partition 231, which contains commercially available software under general public license (which may be modified to some extent to suit a gaming environment); system code stored in a system code partition 232 which contains gaming specific device drivers, an audio visual library, an emulator, communication software and market related modules of software; and game code stored as one or more game code packages in a game code partition 233 which provides game logic, mathematics and multimedia resources required for a specific game to be played on the electronic gaming machine.

The CPU 240 executes an authentication function 244. Prior to execution of any of the code 231, 232, 233, the authenticator 244 authenticates this code.

The CPU also executes a data modification controller function 242 which determines whether any of the code in the storage medium 230 is to be modified, controls the updating, removal, replacement or addition to that code and also ensures that if there is any modifying code received that this results in the authenticator 244 authenticating the program code that modified the partition prior to execution of that program code. In the embodiment it is envisaged that code will be modified in two ways.

A first form of modification arises because the size of the storage medium inherently impose limits on the amount of software that can be stored thereon. The storage medium may be compact flash, a hard drive or similar. Accordingly, it is envisaged that not all games playable on the gaming machine 220 will be stored on the gaming machine. Therefore, the player interface 250 of the electronic gaming machine 220 includes a game request input mechanism 252 to allow the player to select a game which is not be currently resident in the game code 233 of the gaming machine 220. This game request is sent from the player interface 250 to the data modification controller 242 which will pull the requested game from the content server 260.

A game request handler 280 of the content server 260 obtains the game code from a game code database 282 and sends it to the gaming machine 220 as a game code package. The data modification controller 242 determines that this game code package is to be written to the game code partition 233, writes the code to the game code partition 233 and advises the authenticator 244 that the game code partition 233 has been modified. The authenticator then authenticates the game code package 233 prior to the CPU executing the game code and allowing the player to play the game specified by the game code.

In a variation of the above embodiment, the authenticator authenticates all software packages in a partition if any modification is made to the partition. In an example, this may be done by re-authenticating the entire partition.

Accordingly, code such as game code which is expected to be modified more frequently than other code can be stored in a separate partition or partitions to other code. A person skilled in the art will appreciate that the core code or system code would not necessarily need to be kept in separate partitions. However there are some commercial advantages in keeping system specific code separate from general purpose code. In particular, keeping this code separate allows it to be approved by regulators in isolation of approval of the game code and also in isolation of one another.

The second form of code modification which is anticipated is where it is determined code contained within the gaming machine and in particular core and system code requires an update or a patch. Thus, the update controller 270 may determine based on a current machine status stored in a database 276 that a particular electronic gaming machine needs an update of components of core and system code 272, 274. The update controller pushes this data to the data modification controller 242 which recognises that both the core 231 and system 232 code requires modification. The data modification controller writes the updated program code to the partitions that hold the core and system code and advises (or launches) the authenticator to have it authenticate the modified partition.

A person skilled in the art will appreciate that in some embodiments there may be more than the three partitions outlined above. For example, two partitions for game code and one for each of system and core code.

Figure 3:
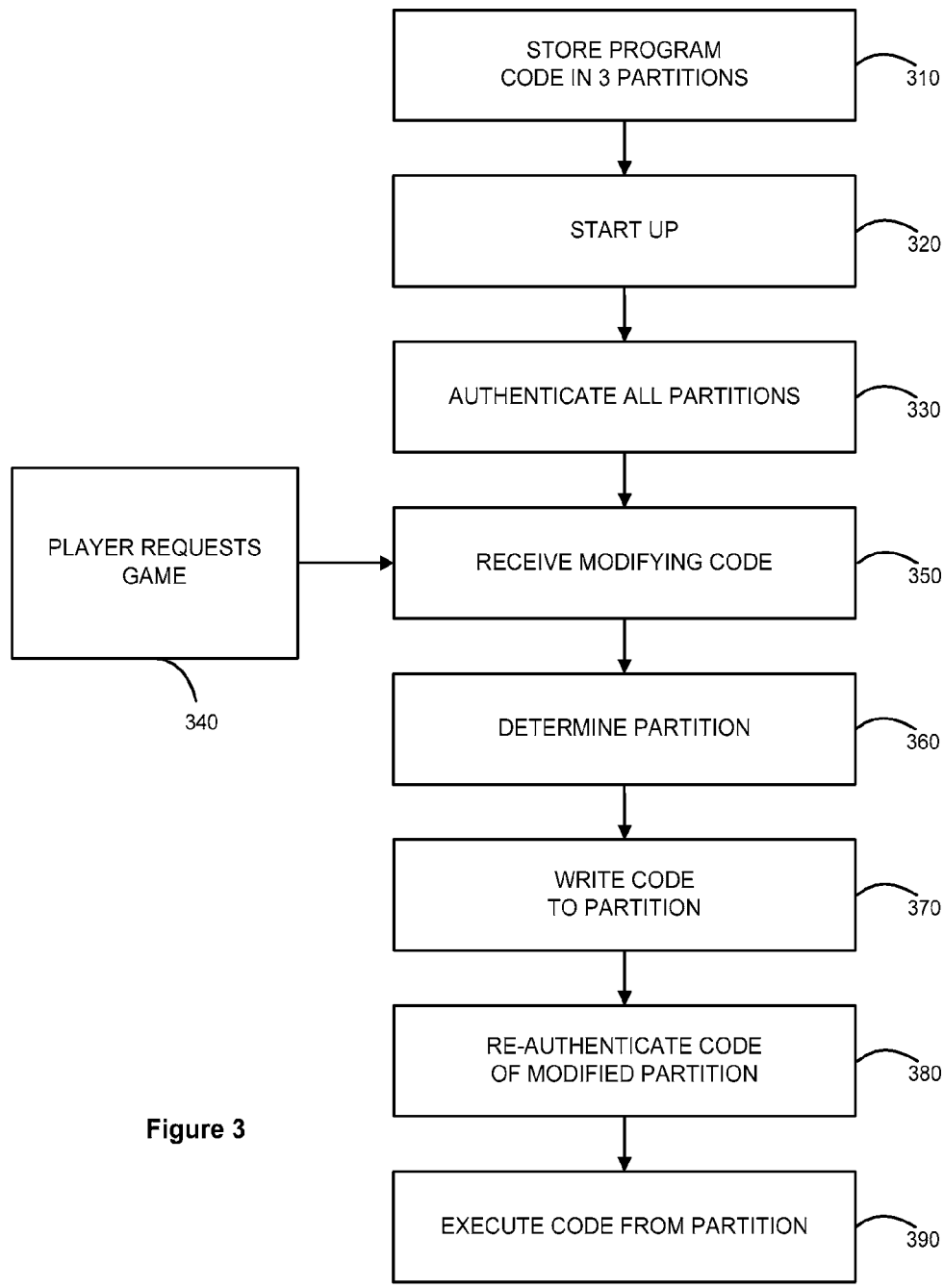
FIG. 3 shows a flow chart of the method of the embodiment.

The method is shown in more detail in FIG. 3. A step 310 the program code is stored in three partitions. Start up occurs at step 320 following which the code of all partitions is authenticated 330. During the start up process, a master public key is made available to the CPU. Manifest files are provided for the core code, the system code and each game code package. For example, there may be a Game A package and a Game B package. Each manifest file contains a list of files contained in the package and a DSA signed cumulative hash of the files, signed with a master private key. The CPU checks that all listed files are present, calculates a HMAC SHA-1 hash of each listed file, calculates a cumulative hash and verifies the cumulative hash against the digitally signed cumulative hash using the master public key. At step 350 modifying code is received. As described above, This may be as a result of an update being determined by a content server or as a result of a player request to a game 340. At step 360 the method involves determining which partition needs to be updated and the code is written to the partition at step 370. The code written to the modified partition will have a manifest file with a cumulative hash and is authenticated 380 using the same technique described above, prior to execution of code from the partition 390.

Persons skilled in the art will appreciate that there maybe variations to the authentication technique. For example, while the above embodiment employs SHA-1 hashes and DSA signatures, other cryptographic hashes and encryption techniques may be employed, for example RSA or ECC.

These and other variations will be apparent to persons skilled in the art and should be considered as falling within the invention described herein.

In the claims which follow and in the preceding description of certain embodiments of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in any country.

The invention claimed is:

1. An electronic gaming machine, comprising:
   one or more electronic storage mediums arranged into at least two logically separate partitions, including a first logical partition and a second logical partition, wherein the first logical partition is allocated to a first category of program code having a first expected probability of code modification, and the second logical partition is allocated to a second category of program code having a second expected probability of code modification that is less than the first expected probability of code modification;
   an authenticator configured to execute an initial authentication of all software packages stored on the first and second logical partitions during an initial system boot;
   a modification controller arranged to receive modified program code from one or more servers, wherein the modification controller is configured to determine whether the modified program code belongs to the first category of program code or the second category of program code, wherein the modification controller is configured to store the modified program code in the first logical partition if the modified program code belongs to the first category, and wherein the modification controller is configured to store the modified program code in the second logical partition if the modified program code belongs to the second category; and
   wherein, in response to storage of the modified program code in either the first or second logical partitions by the modification controller, the authenticator re-authenticates only the entire logical partition of the first and second logical partitions in which the modified program code is stored, including all software packages stored on the logical partition, prior to executing the stored modified program code, wherein the modified program code is executed from the re-authenticated logical partition after any authentication of the logical partition during the initial system boot and prior to any subsequent system boot.

2. An electronic gaming machine as claimed in claim 1, wherein the authenticator authenticates each logically separate partition at least each time the gaming machine is booted.

3. An electronic gaming machine as claimed in claim 1, wherein the authenticator authenticates each software package at least each time the gaming machine is booted.

4. An electronic gaming machine as claimed in claim 1, wherein a modification comprises one or more of an addition of program code to the respective logical partition, replacement of program code to the respective logical partition, or an update to program code to the respective logical partition.

5. An electronic gaming machine as claimed in claim 1, wherein the first category of program code is game code.

6. An electronic gaming machine as claimed in claim 1, comprising three categories of program code stored in logically separate partitions, wherein the program code comprises game code, core code and system code.

7. An electronic gaming machine as claimed in claim 5, wherein there are three logically separate partitions.

8. An electronic gaming machine as claimed in claim 1, wherein the logically separate partitions are on the same storage medium.

* * * * *

UNITED STATES PATENT AND TRADEMARK OFFICE
CERTIFICATE OF CORRECTION

PATENT NO.         : 8,438,399 B2
APPLICATION NO.    : 12/057567
DATED              : May 7, 2013
INVENTOR(S)        : Lenger Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this
Second Day of December, 2014

Michelle K. Lee
*Deputy Director of the United States Patent and Trademark Office*